Allyn & Hildreth,
Clothes-Line Reel,
No. 1,863. Patented Nov. 26, 1840.
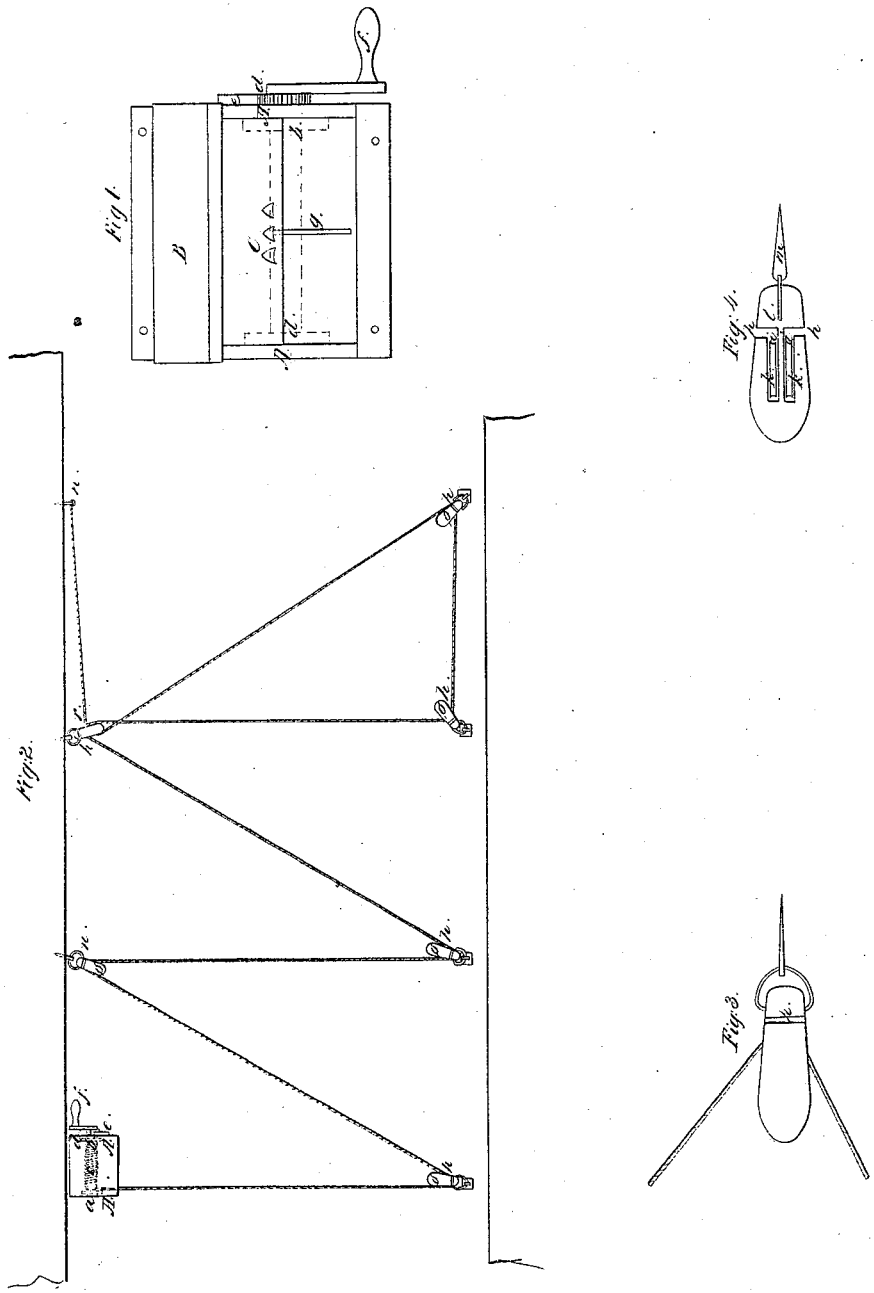

UNITED STATES PATENT OFFICE.

E. ALLYN AND C. B. HILDRETH, OF BOSTON, MASSACHUSETTS.

MACHINERY FOR STRAINING AND PRESERVING CLOTHES-LINES.

Specification of Letters Patent No. 1,863, dated November 26, 1840.

*To all whom it may concern:*

Be it known that we, EDWIN ALLYN and C. B. HILDRETH, both of Boston, in the county of Suffolk and State of Massachusetts, have invented new and useful Improvements in Machinery for Straining and Preserving Clothes-Lines.

These improvements, the principles thereof, the application of said principles by which the same may be distinguished from other inventions of a similar character, together with such parts or combinations as we claim to be our invention and for which we solicit Letters Patent we have herein set forth in the following description, and exhibited in the accompanying drawings herein referred to, which taken in connection form our specification.

It is well known that by exposure to the rain, &c., of inclement seasons, clothes-lines and cordage of every description become rotten and in the course of time unfit for use. This added to the great inconvenience experienced in arranging and taking in the lines by any of the various plans now in use, has led to the invention of our apparatus.

Figures 1, 2, 3, and 4 represent our improvements. Fig. 1, is a front elevation of the reeling apparatus and the box or casing which incloses the same. Fig. 2, is a plan of the same showing the line as strained through the snatch-blocks, Figs. 3 and 4 being detailed views of the various kinds of snatch blocks.

A A is the casing, the top B of which is sufficiently inclined to cause the water to pass off, and the sides of which project downward sufficiently far to completely protect the spool or bobbin $a\ b$ Fig. 1, and the line $c$ wound thereon, shown by blue lines in Fig. 2. The journals of the bobbin rest and revolve in suitable bearings in the sides of the casing, a ratchet wheel $d$ and weighted catch $e$, being arranged on the end of one journal, to prevent the bobbin from turning backward, when the line is strained (as will be hereinafter explained), by the winch $f$ firmly fixed on said journal on the outside of the ratchet wheel.

The casing A A has a slide C in front the ends of which work in suitable grooves, which may be lowered at pleasure to allow the line to pass out or in, being raised or closed when the line is wound on the bobbin, and when closed being kept in position by the spring $g$ Fig. 1 the operation of which will be readily understood by inspecting the drawing.

The snatch blocks, through which the line is passed to be strained, are shaped as represented in Figs. 3 and 4, the former representing a single and the latter a double snatch block. Transverse and vertical grooves $h$, $i$, are formed in the block the latter being at right angles to the former and opening into and communicating with the same. A sheave $k$ is arranged in the usual manner in the vertical groove $i$, and a half ring $l$ is connected to the top of the block, having its ends bent and passing into suitable holes in the sides of the block so that the block will play loosely on the same. A staple $m$ shaped as seen in the Figs. 2 and 3, is placed on the ring, by which the block is confined to the top of a post or the side of a wall. The double block differs from the single one, only in having two sheaves and two sets of grooves, the similar parts being denoted by the same letters as in the single block.

The reel box or casing A A being fastened in any convenient manner to a wall or elsewhere if we wish to arrange and strain the line, we have only to open the slide C, and taking the end of the line, to which a hook $n$ is attached (see Fig. 2) and throw it successively, at pleasure, into each of the transverse grooves $h$ of the several blocks $o$, $o$, $o$, &c., according to the various directions we wish the line to take, using the double block when we wish to take two directions from the same point as shown at $p$, Fig. 2. Then by securing the hook $n$, at the end of the line to some convenient point, and turning the windlass or winch $f$, the line may be strained to any required degree of tension, the ratchet and catch serving to keep it in this state or position. In case of rain if we wish to "take in the line" we have only to unhook the end of the same and turn the windlass until the line is wound on the bobbin, and by closing the slide C the line will be completely sheltered.

Having thus described our improvements, we shall claim as our invention,

The combination of the spool or bobbin, having a windlass ratchet-wheel and catch, with a casing having a slide in front, and also with the single and double snatch blocks, the whole being constructed, arranged and operating substantially as hereinabove specified, and for the purposes of straining and preserving clothes-lines.

In testimony that the above is a true description of our said invention and improvements we have hereto set our signatures this eighth day of September in the year eighteen hundred and forty.

EDWIN ALLYN.
  CLIFTON B. HILDRETH.

Witnesses:
 GEO. D. DANA,
 R. H. EDDY.